United States Patent
Boinet et al.

(10) Patent No.: US 12,331,995 B2
(45) Date of Patent: Jun. 17, 2025

(54) GLASS FURNACE PROVIDED WITH OPTICAL FIBERS

(71) Applicant: SAINT-GOBAIN CENTRE DE RECHERCHES ET D'ETUDES EUROPEEN, Courbevoie (FR)

(72) Inventors: Mickaël Boinet, Cavaillon (FR); Isabelle Cabodi, Cavaillon (FR); Olivier Citti, Cavaillon (FR); Vincent Gleize, Avignon (FR); Jean-Gaël Vuillermet, Cavaillon (FR)

(73) Assignee: SAINT-GOBAIN CENTRE DE RECHERCHES, Courbevoie (FR)

( * ) Notice: Subject to any disclaimer, the term of this patent is extended or adjusted under 35 U.S.C. 154(b) by 728 days.

(21) Appl. No.: 17/263,812

(22) PCT Filed: Jul. 26, 2019

(86) PCT No.: PCT/EP2019/070232
§ 371 (c)(1),
(2) Date: Jan. 27, 2021

(87) PCT Pub. No.: WO2020/025492
PCT Pub. Date: Feb. 6, 2020

(65) Prior Publication Data
US 2021/0310738 A1 Oct. 7, 2021

(30) Foreign Application Priority Data
Aug. 1, 2018 (FR) .................................. 1857215

(51) Int. Cl.
*F27D 19/00* (2006.01)
*C03B 5/16* (2006.01)
*F27D 21/00* (2006.01)

(52) U.S. Cl.
CPC ................ *F27D 19/00* (2013.01); *C03B 5/16* (2013.01); *F27D 21/0014* (2013.01); *F27D 2019/0003* (2013.01)

(58) Field of Classification Search
None
See application file for complete search history.

(56) References Cited

U.S. PATENT DOCUMENTS

| 3,885,945 A | 5/1975 | Rees et al. |
| 6,723,162 B1 | 4/2004 | Cheyrezy et al. |

(Continued)

FOREIGN PATENT DOCUMENTS

| DE | 19853785 A1 | 5/2000 |
| DE | 10236033 A1 | 2/2004 |

(Continued)

OTHER PUBLICATIONS

DE10236033A1—EPO Machine Translation Performed Sep. 18, 2023. (Year: 2023).*

(Continued)

*Primary Examiner* — Lisa L Herring
(74) *Attorney, Agent, or Firm* — Ronald M. Kachmarik; Cooper Legal Group LLC

(57) ABSTRACT

A glass furnace including a refractory portion defining a hot face in contact or intended to be in contact with molten glass or with a gaseous environment in contact with molten glass, and a cold face at a distance from the hot face, and a temperature measurement device. The temperature measurement device including a waveguide that includes a measurement portion including at least one temperature measurement sensor configured to send a response signal in response to the injection of an interrogation signal into the waveguide. The temperature measurement device including an interrogator connected to an input of the waveguide and configured (Continued)

to inject the interrogation signal into the input, to receive the response signal returned by the sensor in response to the injection of the interrogation signal, to analyze the response signal received and to transmit a message according to the analysis.

17 Claims, 4 Drawing Sheets

(56) References Cited

U.S. PATENT DOCUMENTS

| | | | |
|---|---|---|---|
| 2011/0144790 A1 | 6/2011 | Gerritsen et al. | |
| 2015/0047534 A1* | 2/2015 | Consales | C04B 35/6263 106/816 |
| 2016/0003401 A1 | 1/2016 | Akamine et al. | |
| 2016/0039702 A1* | 2/2016 | Nagai | C03B 5/43 65/374.13 |
| 2018/0275339 A1* | 9/2018 | Blue | G02B 6/02076 |

FOREIGN PATENT DOCUMENTS

| | | | | |
|---|---|---|---|---|
| EP | 2312250 A1 | | 4/2011 | |
| JP | S63317749 A | | 12/1988 | |
| JP | H0474813 A | | 3/1992 | |
| JP | 08027506 A | * | 1/1996 | |
| JP | H08-50064 A | | 2/1996 | |
| JP | H08-240323 A | | 9/1996 | |
| JP | 2001-89165 A | | 4/2001 | |
| JP | 2002-71323 A | | 3/2002 | |
| JP | 2005-621238 A | | 3/2005 | |
| JP | 2007055895 A | | 3/2007 | |
| JP | 2011-527417 A | | 10/2011 | |
| JP | 2016104682 A | | 6/2016 | |
| JP | 2017065985 A | * | 4/2017 | C03B 5/43 |
| WO | 2004015349 A2 | | 2/2004 | |

OTHER PUBLICATIONS

DE19853785A1—EPO Machine Translation Performed Sep. 18, 2023. (Year: 2023).*
JP2017-065985—Clarivate Analytics Machine Translation retrieved Sep. 19, 2023. (Year: 2023).*
JP08027506 EPO Machine Translation Retrieved Feb. 14, 2024. (Year: 2024).*
Ghazanfari et al., "Advanced ceramic components embedded sapphire optical fiber sensors for high temperature applications", Materials & Design, vol. 112, 2016, pp. 197-206. (Year: 2016).*
International Search Report corresponding to International Application No. PCT/EP2019/070232 dated Oct. 8, 2019, 7 pages.
Japanese Office Action, from Corresponding Japanese Application No. 2021-504814, dated Dec. 20, 2022, 15 pages.
Japanese Office Action, from Corresponding Japanese Application No. 2021-504814, dated Apr. 5, 2022, 15 pages.
Chinese Office Action, from Corresponding Chinese Application No. 201980064500.2, dated Jan. 5, 2023, 20 pages.
Russian Office Action, from Corresponding Russian Application No. 2021102067/03(004296), dated Sep. 10, 2021.

* cited by examiner

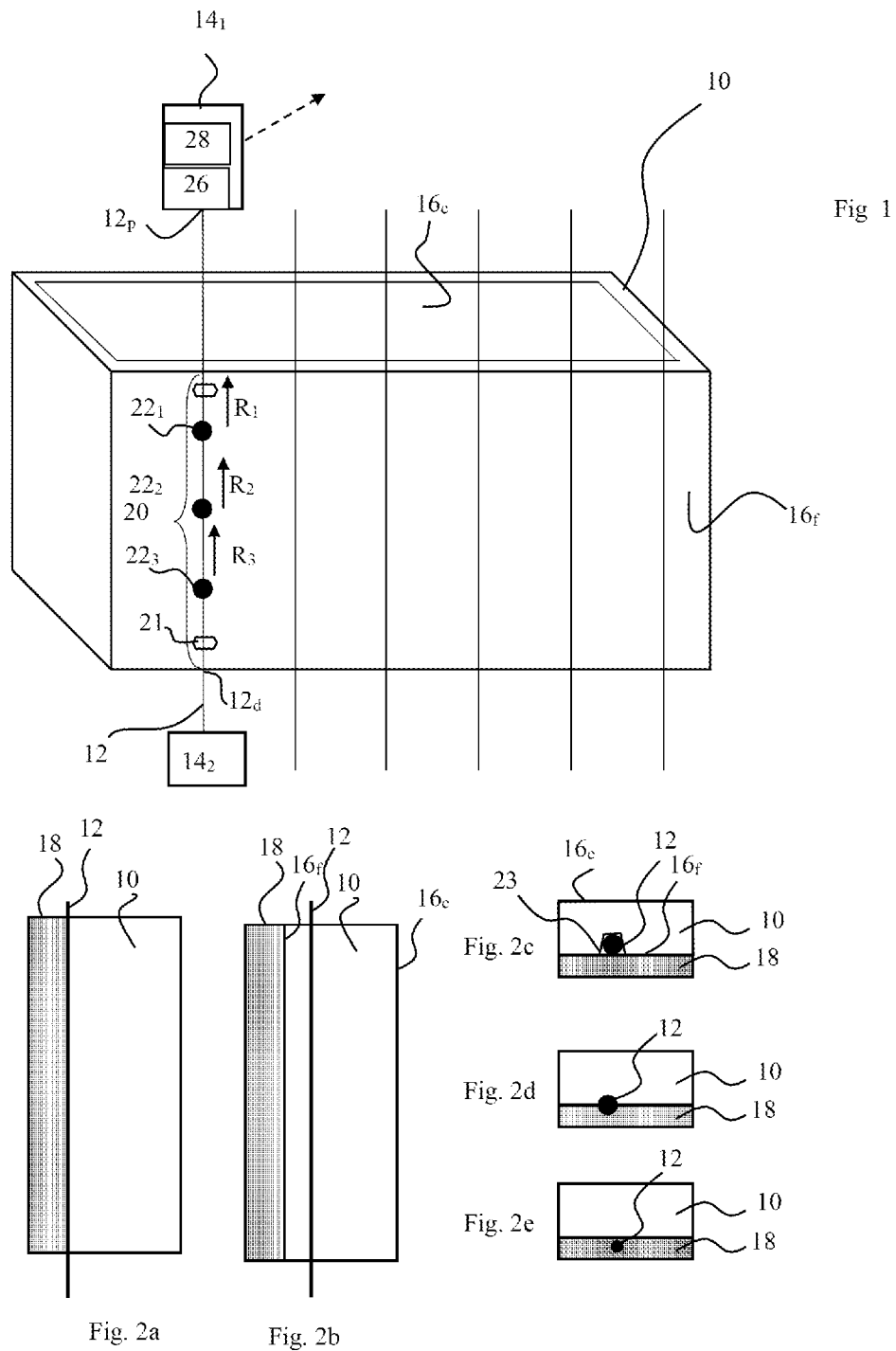

GLASS FURNACE PROVIDED WITH OPTICAL FIBERS

TECHNICAL FIELD

The present invention relates to a glass furnace provided with at least one waveguide, preferably an optical fiber.

PRIOR ART

Reading the temperatures at different locations in a glass furnace makes it possible to check its state, in particular to detect hot spots corresponding to thermal bridges. This reading is conventionally performed by means of thermocouples. However, the implementation of thermocouples is time-consuming and does not allow continuous monitoring of the entirety of a structure, since the number of measurements is limited.

Alternatively, temperatures are measured by infrared thermography, but this is possible only at locations that are visually accessible by an infrared camera, which excludes in particular the insulated portions of the blocks and the floor of the furnace.

There is therefore a need for a solution that facilitates the reading of temperature measurements at numerous points on a structure and allows continuous and precise monitoring of their changes.

An aim of the invention is to address this need, at least partially.

SUMMARY OF THE INVENTION

According to the invention, this aim is achieved by means of a glass furnace comprising:
- a refractory portion defining a hot face in contact or intended to be in contact with molten glass or with a gaseous environment in contact with molten glass, and a cold face at a distance from said hot face, and
- a temperature measurement device comprising:
  - a waveguide comprising a measurement portion comprising at least one temperature measurement sensor configured to send a response signal in response to the injection of an interrogation signal into the waveguide; and
  - an interrogator connected to an input of the waveguide and configured to inject the interrogation signal into said input, to receive said response signal returned by the sensor in response to the injection of said interrogation signal, to analyze the response signal received and to transmit a message according to said analysis.

In one preferred embodiment, the measurement portion is in contact with said cold face and, preferably, extends against the cold face.

The measurement portion may also be partially or completely incorporated within the refractory portion.

As will be seen in more detail in the remainder of the description, a waveguide is a particularly effective and practical means. In particular, a plurality of sensors can be incorporated into the same waveguide and a plurality of waveguides can be connected to the same interrogator. It is thus possible to easily construct a network of measurement points. This network can be kept in place so as to allow continuous measurement.

A furnace according to the invention may also comprise one or more of the following optional features:
- the waveguide is an optical fiber, preferably made of glass or of sapphire;
- the sensor is a Bragg grating;
- the waveguide has a diameter of less than 200 micrometers;
- the refractory portion is an assembly of refractory blocks, in particular a side wall or a bottom of a glass melting tank;
- the measurement portion of the waveguide comprises a plurality of said sensors, preferably more than five, more than eight, more than ten, preferably more than twenty sensors;
- the sensors are arranged at regular intervals along the waveguide;
- the interrogator is configured to determine, according to the analysis of the response signal, a level of wear of the refractory portion and/or a temperature of the hot face and/or a change in the temperature of the hot face;
- the waveguide does not penetrate into the interior of the refractory portion;
- at least the measurement portion of the waveguide extends sandwiched between said cold face and a thermally insulating layer, or within said thermally insulating layer;
- the thermally insulating layer consists of at least two elementary insulating layers;
- at least the measurement portion of the waveguide extends sandwiched between two successive elementary insulating layers of said insulating layer;
- at least the measurement portion of the waveguide extends within one of the elementary insulating layers of said insulating layer;
- the cold face is opposite, and preferably substantially parallel to, the hot face;
- the waveguide takes the general shape of a fiber, the measurement portion of which is preferably substantially rectilinear;
- the measurement portion of the waveguide extends, at least partially, or even completely, parallel to the hot face and/or to the cold face;
- the measurement portion extends sandwiched between said cold face and a thermally insulating layer;
- the interrogator and/or the measurement portion are accommodated in a compartment made on the cold face or on the insulating layer or on an elementary insulating layer, in particular in the form of a recess or "groove", or through the refractory portion, the insulating layer or the elementary insulating layer, preferably in the form of a tubular hole, which may be rectilinear or not rectilinear, or blind or pass all the way through;
- the interrogator and/or the measurement portion are secured to the refractory portion and/or, as applicable, to the insulating layer, by at least one securing point, said securing point having a length, along the measurement portion, preferably greater than 1 mm, greater than 3 mm and/or preferably less than 5 cm, preferably less than 3 cm, 2 cm, 1 cm, or 0.5 cm;
- the furnace comprises a sheet consisting of a set of measurement portions of said waveguides extending along a curved or planar, preferably planar, surface, preferably along a plane parallel to the hot face and/or to the cold face;
- said measurement portions of the sheet extend parallel to one another and/or intersect;
- the measurement portions of said sheet do not intersect and extend, preferably parallel to one another, while being spaced apart from one another by a distance greater than 1 cm, greater than 5 cm, greater than 10 cm, greater than 20 cm, and/or smaller than 100 cm, smaller than 80 cm, or smaller than 50 cm;

at at least some of the intersections between measurement portions, sensors are arranged on each measurement portion;

preferably, at more than 50%, preferably more than 80%, preferably more than 90%, preferably 100% of the intersections between measurement portions, each measurement portion has a sensor;

at said intersections, all of the measurement portions are in contact with one another;

the number of measurement portions intersecting at a point of intersection is greater than two, or even greater than three or greater than five;

the furnace comprises at least first and second said sheets which preferably extend parallel to one another;

the distance between the first and second sheets is greater than 1 cm, greater than 3 cm, greater than 5 cm, and/or less than 10 cm;

said measurement portions of the first sheet extend parallel to one another;

said measurement portions of the second sheet extend parallel to each other, preferably in a direction different from the direction of the measurement portions of the first sheet, the angle between said directions preferably being greater than 45°, than 60°, than 80° and/or less than 120°, preferably less than 100°;

when the first and second sheets are viewed in a direction normal to at least one of said first and second sheets, said measurement portions of the first sheet intersect said measurement portions of the second sheet and, preferably, at more than 50%, preferably more than 80%, preferably more than 90%, preferably 100% of the intersections, each measurement portion has a sensor;

the sensors of the sheet are distributed in a pattern, preferably in a regular pattern, preferably so as to form a square or rectangular mesh grid;

the sheet extends beneath the floor or between two elementary insulating layers of the floor;

the furnace comprises a plurality of said sensors, which may be in contact or not in contact, superposed along a direction perpendicular to the hot face;

each end of the waveguide is connected to a respective interrogator.

The invention also relates to a method for reading measurements relating to a refractory portion of a glass furnace according to the invention, said method comprising the following steps:

a. producing a glass furnace according to the invention;
b. controlling the interrogator such that it injects an interrogation signal into the input of the waveguide and receives a response signal from the sensor;
c. analyzing the response signal so as to determine information dependent on said response signal, and in particular relating to a temperature of the refractory portion in the region of the sensor.

BRIEF DESCRIPTION OF THE FIGURES

Other features and advantages of the invention will become more clearly apparent from reading the following detailed description and from examining the appended drawing, in which:

FIG. 1 schematically shows the side wall of one preferred embodiment of a furnace according to the invention, shown in perspective;

FIG. 2 (2a-2e) and FIG. 5 show cross sections (FIGS. 2a and 2b, FIG. 5) and views from above of details of the side wall of FIG. 1, the insulating layer being shown;

Figure 3A:
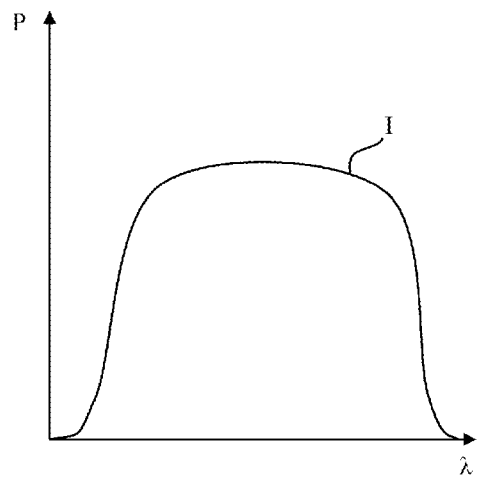
FIG. 3 (3a-3d) illustrates various signals used in a device according to the invention.

In the various figures, identical references are used to denote identical or analogous members.

DEFINITIONS

What is meant by "refractory portion" is an element of the furnace made of a refractory material. A refractory portion may be a block, but also an assembly of blocks, for example a side wall of a tank, or a floor, in particular formed by casting. A refractory portion is conventionally made from a molten material or from a sintered material. Conventionally, an insulating layer covers the cold face of the refractory portion in order to limit heat exchange.

Conventionally, the "thickness" of a refractory portion of a glass furnace is its dimension measured in a direction perpendicular to its hot face. For example, for a tank side block in contact with molten glass, the thickness is measured in a substantially horizontal direction toward the bath of molten glass. For a floor, the thickness is measured in a vertical direction.

The "hot face" is the face of a refractory portion which is exposed to a space of the furnace containing molten glass or intended to contain molten glass. The hot face may be in contact, or intended to be in contact, with molten glass and/or with the gaseous environment that extends above the molten glass. The hot face is thus the face of the refractory portion which is subjected or is intended to be subjected to the highest temperatures. All of the hot faces of the blocks of the side wall of the glass melting tank may together also, by extension, be qualified as a "hot face". The upper surface of the floor may also be qualified as a "hot face".

Unless specified otherwise, the "depth" is measured perpendicular to the hot face, toward the interior of the refractory portion.

The adjective "hot" is used for the sake of clarity. Before the furnace is in service, the "hot" face is the face which is intended to be subjected to the highest temperatures after being put into service.

A "cold face" is a surface of the refractory portion which is not exposed to a space of the furnace containing molten glass or intended to contain molten glass, that is to say which is insulated from this space by the material of the refractory portion. The cold face opposite the hot face is the face which is furthest from said space. Conventionally, the cold face opposite the hot face is the face which, in service, is subjected or which is intended to be subjected to the lowest temperatures. The cold face may be parallel to the hot face.

What is meant by "waveguide" is any means, different from the refractory portion, for guiding an electromagnetic wave, and in particular a wave in the visible frequencies.

A measurement portion "extends" within a layer (insulating layer, elementary insulating layer, refractory portion of the furnace enclosure) or between two layers when it extends substantially completely within said layer or between said two layers.

To assess whether two measurement portions intersect, these measurement portions are preferably viewed perpendicular to the hot face.

"Include", "have" or "comprise" should be interpreted in a broad, non-limiting manner.

DETAILED DESCRIPTION

In general, the enclosure of a glass furnace comprises a refractory portion and an insulating layer 18 adjacent to the cold face of the refractory portion and intended to limit heat exchange through conduction between the interior and the exterior of the furnace.

The refractory portion therefore constitutes the first layer of the enclosure, from the interior of the furnace. It may constitute the wall of the tank or the floor.

It conventionally consists of an assembly of blocks. These blocks generally take the form of refractory slabs to form the floor. Any refractory block used in conventional glass furnaces, potentially in the form of a slab, may be used. In particular, each block may be made from a molten material.

The refractory portion, in particular a block, may consist of a material consisting, for more than 90% of its weight, of one or more oxides chosen from the group consisting of $ZrO_2$, $Al_2O_3$, $SiO_2$, $Cr_2O_3$, $Y_2O_3$, and $CeO_2$. This material preferably comprises more than 90% $ZrO_2$, $Al_2O_3$ and $SiO_2$. In one embodiment, this material is an AZS (that is to say a product, preferably molten, the majority constituents by weight of which are $Al_2O_3$, $ZrO_2$ and $SiO_2$) and has more than 15% $ZrO_2$, preferably between 26 and 95% $ZrO_2$. Its composition is typically, for a total of more than 90%, preferably more than 95%: 26 to 40% $ZrO_2$; 40 to 60% $Al_2O_3$; 5 to 35% $SiO_2$. The vitreous phase represents approximately 5 to 50%, preferably between 10 and 40%. Preferably, this vitreous phase is a silicate phase, the proportion by weight of $Na_2O$ of which is lower than 20%, preferably lower than 10% and/or the proportion by weight of $Al_2O_3$ of which is lower than 30%.

All of the percentages are conventionally by weight based on the oxides. Preferably, the refractory oxides represent more than 90%, preferably more than 95%, preferably more than 98% of the weight of the refractory block.

The refractory portion is preferably made of a material resistant to temperatures of higher than 500° C., or even 600° C., or even 1000° C. or even 1400° C.

In the embodiment of FIG. 1, the glass furnace according to the invention comprises a furnace refractory portion in the form of an assembly of refractory blocks 10, a waveguide, in this case an optical fiber 12, and a first interrogator $14_1$. The assembly of refractory blocks may be a side wall of a glass furnace tank, but the invention is not limited to such a side wall. FIG. 1 shows a side wall with four vertical planes.

The shape of the side wall is not limiting.

In the embodiment shown, it consists of refractory blocks taking a general rectangular parallelepipedal shape and defines a hot face $16_c$ and a cold face $16_f$, opposite the hot face $16_c$.

The thermally insulating layer 18, not shown in FIG. 1, is arranged against the cold face of the refractory portion, preferably of the side wall or of the floor. In particular, the insulating layer may encircle the side wall of the glass melting tank of the furnace or extend beneath the entire surface of the cold face of the floor.

Preferably, the thickness of the insulating layer 18 is greater than 10 cm, preferably greater than 20 cm, preferably greater than 30 cm.

The insulating layer 18 may be in one piece, in particular when the refractory portion is a floor. In particular, it may consist of a layer of concrete which extends beneath slabs constituting the floor. Advantageously, it may thus have a sealing function.

Alternatively, the insulating layer may be an assembly of a plurality of insulating blocks or, preferably, of a plurality of elementary insulating layers, which, themselves, may be assemblies of blocks.

Figure 5:
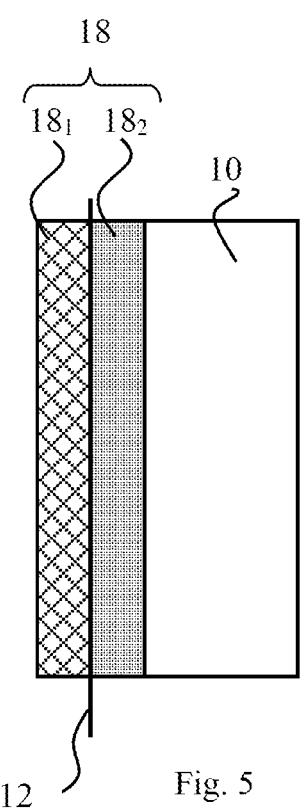

FIG. 5 shows for example an assembly of a plurality of adjacent elementary insulating layers $18_1$, $18_2$.

For the sake of clarity, a distinction is made in the present description between an "elementary insulating layer" and an "insulating layer". An "insulating layer" may consist of a single layer or of a plurality of "elementary insulating layers".

The insulating layer 18 may consist of a layer made of a single material. Preferably, the elementary insulating layer 18 then has a thermal conductivity of lower than 1.3 $W \cdot m^{-1} \cdot K^{-1}$ or even lower than 1.0 $W \cdot m^{-1} \cdot K^{-1}$.

In one embodiment, the insulating layer 18 consists of a silico-aluminous refractory material, in particular a clay product.

The insulating layer 18 may consist of a plurality of different materials. In particular, it may be formed by juxtaposing a plurality of elementary insulating layers $18_1$, $18_2$ made of different materials.

Preferably, the last elementary insulating layer, that is to say the outermost layer with respect to the interior of the furnace, has a thermal conductivity of lower than 1.3 $W \cdot m^{-1} \cdot K^{-1}$ or even lower than 1.0 $W \cdot m^{-1} \cdot K^{-1}$. All of the usual insulating materials may be used. The one or more elementary insulating layers located in immediate proximity to the cold face may consist of a material consisting, for more than 90% of its weight, of one or more oxides chosen from the group consisting of $ZrO_2$, $Al_2O_3$, $SiO_2$, $Cr_2O_3$, $Y_2O_3$, and $CeO_2$. This material preferably comprises more than 90% $ZrO_2 + Al_2O_3 + SiO_2$.

In one embodiment, at least one elementary insulating layer consists of a silico-aluminous refractory material, in particular a clay product. When the refractory portion is the floor, this material is generally in the form of a refractory concrete, in particular based on AZS grains, in particular on electrofused AZS grains. The one or more elementary insulating layers consisting of this material provide a sealing function with respect to the molten glass.

At least one of the elementary insulating layers may consist of a silico-aluminous refractory material, in particular a clay product.

Optical Fiber and Sensors

The optical fiber 12 is preferably made of glass or of sapphire. An optical fiber made of sapphire is well suited for regions of high temperature.

The optical fiber preferably has a diameter smaller than 200 μm, preferably smaller than 150 μm. Advantageously, its presence does not substantially affect the effectiveness of the insulating layer 18.

The optical fiber 12 extends between a proximal end $12_p$ and a distal end $12_d$. The proximal end $12_p$, or "input", of the optical fiber 12 is connected to the first interrogator $14_1$.

The distal end $12_d$ may be free or be connected to a second interrogator $14_2$.

A portion of the optical fiber 12, called the "measurement portion" 20, extends into the refractory portion or, preferably, in contact with a surface of the refractory portion, preferably against the cold face $16_f$. The measurement portion is the portion which bears the sensors intended to read temperatures. The rest of the optical fiber is used for transmitting signals, in particular between the one or more interrogators and the measurement portion.

The measurement portion 20 is secured to the refractory portion by one or more securing points 21, preferably made of refractory cement, each securing point having a length, along the optical fiber, preferably less than 5 cm, than 3 cm, than 2 cm, than 1 cm, or than 0.5 cm.

In one embodiment, the measurement portion 20 is not rectilinear between two securing points, at ambient temperature. Preferably, the length of optical fiber between two successive securing points is greater than 1.05 times, preferably greater than 1.1 times and/or preferably less than 1.5 times, preferably less than 1.4 times, preferably less than 1.3 times the distance between said securing points. Advantageously, the optical fiber can thus adapt to dimensional variations in the refractory portion to which it is secured.

The measurement portion 20 comprises one, preferably a plurality of, sensor(s) $22_i$, the index "i" denoting a number identifying the sensor. The distance between two successive sensors $22_i$, along the optical fiber 12, may be constant or variable. It is preferably smaller than 50 cm, 30 cm, 20 cm, 10 cm, 5 cm, or even smaller than 3 cm, or 1 cm. The precision of the information provided by the interrogator is improved thereby.

Preferably, a sensor, preferably each sensor, is a local modification of the structure of the optical fiber, which reflects at least a portion of the signal that it receives from the interrogator.

In one embodiment, the optical fiber comprises a plurality of sensors, which each reflect a portion of the interrogation signal I and allow another portion to pass so that it may reach the one or more other sensors arranged downstream. Each operational sensor thus responds to the interrogation signal, which makes it possible, using a single optical fiber, to obtain information from different regions of the refractory portion.

To determine the origin of a response signal, the interrogator can use the difference between the time at which the interrogation signal was transmitted and the time at which the response signal was received.

Figure 3B:
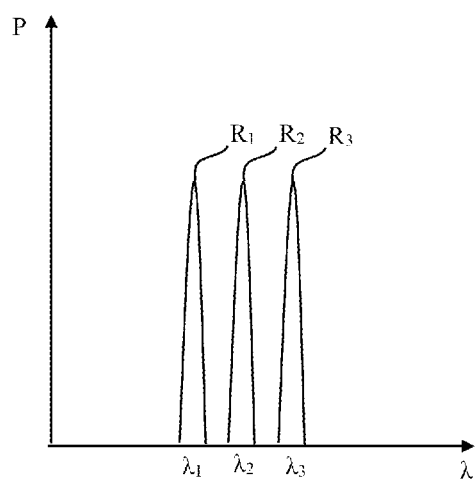
Figure 3C:
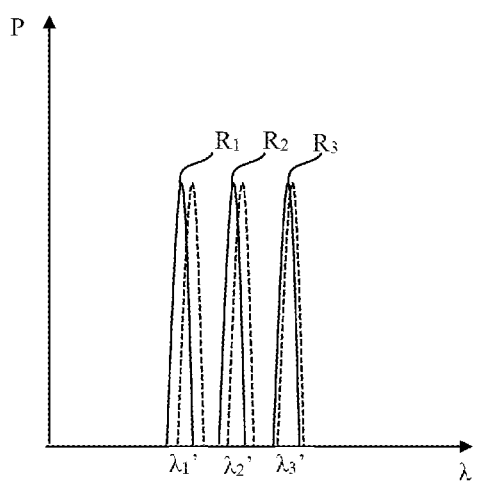

As illustrated in FIG. 3, each sensor may also reflect only a portion of the spectrum of frequencies (frequencies λ in FIG. 3a) of the interrogation signal I injected by the interrogator 14 (in FIGS. 3a, 3b and 3c, "P "denotes the strength of the signals). Just analyzing the frequencies of the signals received thus makes it possible to determine the origin of the response signals. In FIG. 3b, each sensor 22i has thus returned a spectrum of frequencies centered on a frequency $\lambda_i$ that is specific thereto. The interrogator can therefore deduce that the peak centered on the frequency $\lambda_i$ comes from the sensor $22_i$.

Preferably, the sensor is configured to return a response signal that is modified according to the temperature.

A sensor $22_i$, preferably each sensor $22_i$, is a Bragg grating.

Optical fibers with Bragg gratings are known in applications other than glass furnaces.

In response to an interrogation signal I injected by the interrogator 14 via the proximal end of the optical fiber, each Bragg grating $22_i$ returns a response signal $R_i$ that is specific thereto. Advantageously, a Bragg grating may therefore serve as a means for detecting the occurrence of a situation in which the Bragg grating is subjected to a temperature exceeding a threshold value, i.e. causing its destruction. A plurality of Bragg gratings of an optical fiber oriented so as to move away from the hot face of a refractory portion therefore makes it possible to measure, in stages, the wear of this refractory portion.

A Bragg grating also has the advantage of sending a response signal that is dependent on the temperature to which it is subjected. Specifically, each Bragg grating acts as an optical reflector at a wavelength that is specific thereto. However, the heating of the Bragg grating causes this wavelength to change. Of course, the wavelengths specific to the various Bragg gratings are determined so as to avoid any ambiguity as to the Bragg grating at the origin of a response signal. After having identified this originating Bragg grating, the interrogator can determine the change in the wavelength, or in an equivalent manner the change in the frequency, in order to determine the temperature of the originating Bragg grating or a change in this temperature.

FIG. 3c illustrates the preferred particular case in which the sensors are Bragg gratings. In response to the interrogation signal, they can return response signals centered on the frequencies $\lambda_i$ at ambient temperature (FIG. 2b) and at frequencies $\lambda_i'$ shifted with respect to the frequencies $\lambda_i$, respectively, the shift being dependent on the temperature of the sensor $22_i$. In FIG. 3c, the peaks centered on the frequencies $\lambda_i$ are shown as dashed lines and the peaks centered on the frequencies $\lambda_i'$ are shown as solid lines.

The use of an optical fiber with Bragg gratings is particularly effective. Specifically, such an optical fiber is not bulky, may incorporate a plurality of Bragg gratings, and therefore be used for measuring temperatures at different locations, is not affected by the electromagnetic environment and, being conventionally made of a glass, will not contaminate the bath of molten glass if destroyed.

A Bragg grating may therefore serve as a means for measuring the local temperature or the change in this temperature.

Arrangement of the Waveguides

The measurement portion of the optical fiber may extend substantially parallel to the hot face. When the refractory portion is the side wall of the tank, the measurement portion of the optical fiber may in particular extend in the direction of the height of the tank, preferably substantially vertically, more preferably along substantially the entire height of the tank, as in FIG. 1.

Figure 4:
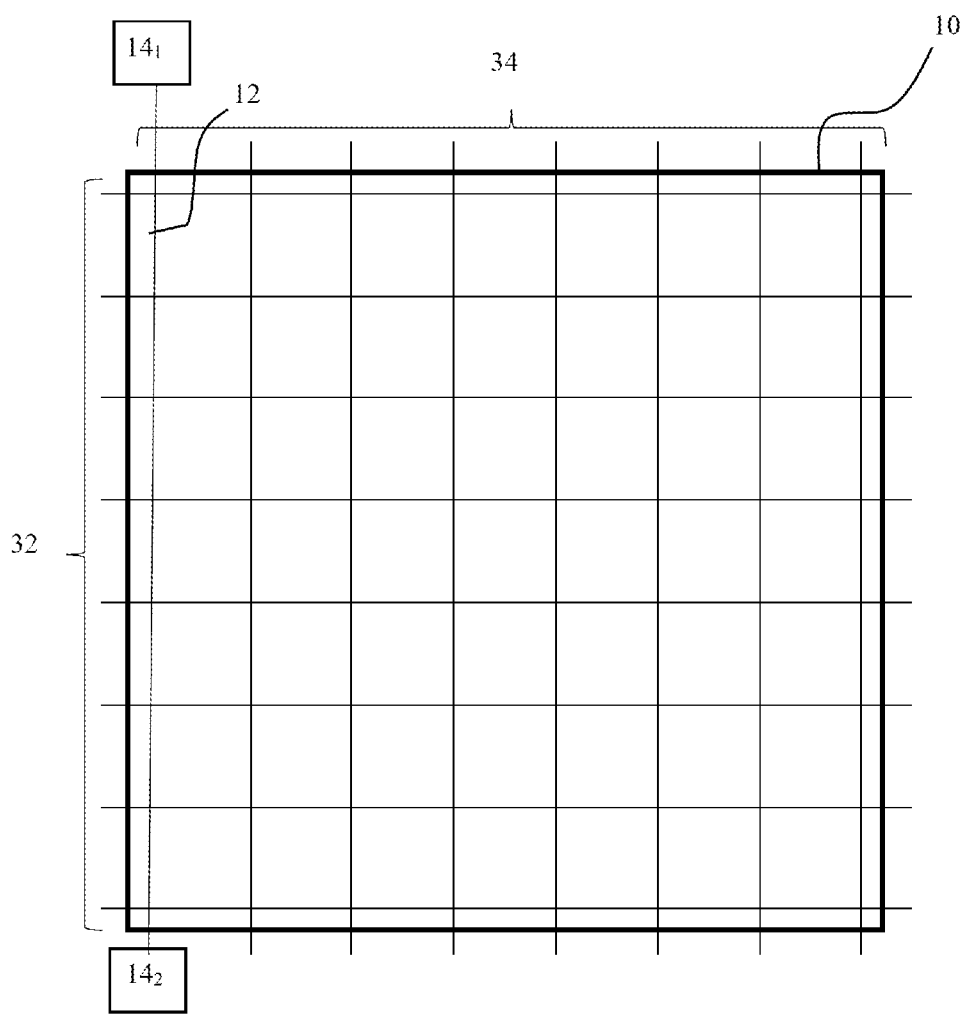
FIG. 4 illustrates an arrangement of optical fibers on a side wall of a furnace according to the invention.
Figure 3D:
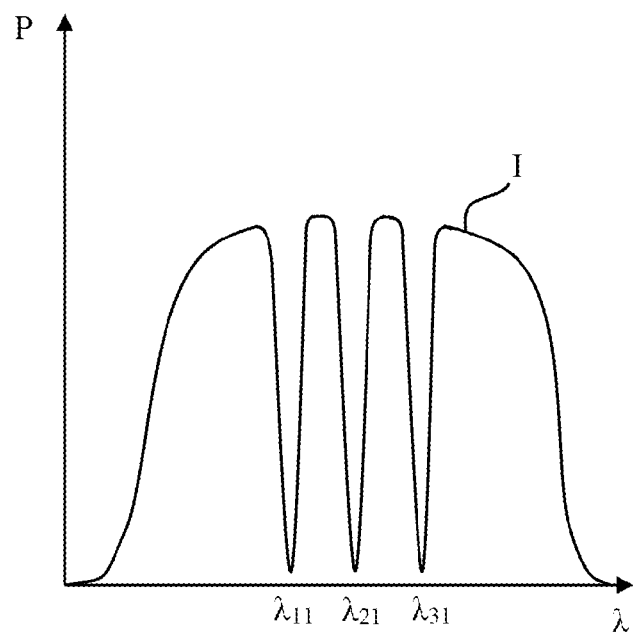

Preferably, there is a network of optical fibers, preferably in the form of one or more sets of fibers, the measurement portions of which are parallel (FIGS. 1 and 4), for example in the form of two sets 32 and 34, the measurement portions of which are oriented at right angles, as shown in FIG. 4.

For the sake of clarity, only one fiber 12 has been illustrated in detail in FIG. 1.

Preferably, the density of sensors is higher than three, preferably higher than 10, preferably higher than 50, preferably higher than 100 sensors per m² of hot face of the refractory portion.

In one embodiment, the network of optical fibers extends all the way around the side wall of the tank, preferably in a regular manner, so that the Bragg gratings of said optical fibers are distributed preferably in a substantially homogeneous manner.

Preferably, the measurement portions of the optical fibers extend in the form of one or more, in particular planar, sheets.

In one embodiment, the sensors are arranged, on each optical fiber, at the intersections between the optical fibers. The network of sensors thus has redundancy.

The redundancy advantageously makes it possible to check that the superposed sensors are operating correctly, by comparing the measurements that they provide.

Some optical fibers can be arranged at different depths, in particular in the form of superposed optical fiber sheets. The depth is conventionally measured from the hot face, perpendicular to the hot face.

The number of superposed sheets is not limiting and the density of sheets may be higher than one, or even higher than two sheets per 10 cm of thickness (measured in the direction of the depth) of the refractory portion.

In one preferred embodiment, the measurement portion extends at least partly, preferably completely, outside the refractory portion, and, preferably, against its cold face. It may in particular be sandwiched between the side wall of the tank and the thermally insulating layer 18, in contact with the cold face of the side wall (FIGS. 2c and 2d).

Preferably, it is housed in a recess 23 (FIG. 2c), preferably a groove, made in the cold face of the side wall or in the hot face of the insulating layer 18 or in one of the faces of an elementary insulating layer, preferably so as not to protrude therefrom.

The measurement portion 20 may also pass through the insulating layer 18 (FIG. 2e).

In one preferred embodiment, it extends sandwiched between two successive elementary insulating layers of said insulating layer 18, as shown in FIG. 5. This embodiment is particularly advantageous for increasing the service life of the measurement portion, while allowing reliable measurements.

The measurement portion may in particular extend within the insulating layer or within a single elementary insulating layer, that is to say exclusively in this layer.

In one embodiment, the measurement portion 20 extends at least partly, preferably completely, inside the refractory portion. This embodiment is well suited for when the refractory portion is a block, for example a side block of the furnace tank.

Various techniques may be used to incorporate the measurement portion into the refractory portion.

In one embodiment, the refractory portion or the insulating layer 18, or an elementary insulating layer, is formed around the measurement portion. The heat resistance of the optical fiber is however limited. This method is therefore well suited for when the refractory portion or the insulating layer 18, or the elementary insulating layer, is produced by sintering, and in particular by sintering at low temperature, typically with hold temperatures lower than 1200° C. Such a method may in particular comprise the following steps:

a) arranging the optical fiber such that a measurement portion extends into a mold;
b) preparing a starting feedstock and introducing said starting feedstock into the mold such that said measurement portion is embedded therein, and optionally compressing the starting feedstock, so as to obtain a preform;
c) sintering the preform at a temperature preferably of between 400° C. and 1200° C.

Such a method advantageously allows close contact between the measurement portion and the refractory portion or the insulating layer 18, or said elementary insulating layer, which allows good heat exchange.

In one embodiment, the optical fiber is inserted, after production of the refractory portion or of the insulating layer 18, or of the elementary insulating layer, in a compartment made in said refractory portion or said insulating layer 18, or said elementary insulating layer, respectively. The compartment is preferably an elongate hole, which may be rectilinear or not, or blind or pass all the way through, and preferably has an internal diameter that is substantially identical to that of the optical fiber, but slightly larger in order to allow the insertion of the optical fiber.

In one embodiment, the compartment, which is preferably blind, does not pass through, in the direction of the thickness, the refractory portion or said insulating layer 18, or said elementary insulating layer. After insertion into the compartment, the distal end 12a therefore does not come out of said refractory portion or of said insulating layer 18 or of said elementary insulating layer.

In another embodiment, the compartment passes through the refractory portion, between two faces, preferably between two side faces (facing faces of adjacent blocks when the refractory portion is a block) or between the upper face and the lower face of the refractory portion.

The compartment may also pass through the insulating layer 18 or said elementary insulating layer, between their two large faces.

Preferably, the difference between the outer diameter of the compartment and the diameter of the optical fiber is less than 20%, preferably less than 10% of the diameter of the optical fiber.

The compartment may be made according to a method comprising the following steps:

a') arranging a wire inside a mold;
b') forming the refractory portion in the mold;
c') removing the wire, which leaves a compartment.

In particular, in step b'), a bath of molten material may be poured into the mold, to produce a molten product.

The wire may extend through the mold so as to form, after being removed from the produced refractory portion, insulating layer or elementary insulating layer, a blind hole or a through-hole.

The wire may for example be made of molybdenum. Preferably, it is covered with a non-stick coating, which facilitates its removal from the refractory portion or from the insulating layer, or from the elementary insulating layer, respectively.

Advantageously, when the refractory portion is made from a molten material, it contracts during its cooling, which facilitates the potential debonding of the wire.

The wire may also be "sacrificial", that is to say made of a material that can be destroyed after production of the refractory portion or of the insulating layer, or of the elementary insulating layer, in which it has been arranged, for example mechanically or by chemical attack.

Interrogator

Each interrogator conventionally comprises a transceiver 26 and a control module 28 (FIG. 1).

The transceiver 26 is suitable for transmitting, as input to the optical fiber 12, an interrogation signal I, for example a light signal, and for receiving the one or more response signals $R_i$ received from the one or more sensors $22_i$.

The control module 28 conventionally comprises a processor and a memory into which a computer program is loaded. Using this computer program, the processor can control the transmission of the interrogation signal and analyze the signals received in order to identify the signals of the sensors which have responded.

Preferably, the computer program makes it possible, when the sensors are Bragg gratings, to measure a frequency shift resulting from the local temperature of a Bragg grating and therefore to evaluate a temperature and/or a change in temperature with respect to previous measurements, and then send a message M containing information on this evaluation. This message may be sent to a central computer and/or be presented to an operator, for example on a screen and/or by activating a light and/or by emitting a sound signal.

Each interrogator is preferably arranged at a distance from the hot face of the refractory portion, more preferably at a distance from the cold face of the refractory portion. It may in particular be arranged between the cold face of the refractory portion and the hot face of the insulating layer 18, in contact with the cold face of the refractory portion.

In one embodiment, each interrogator is outside the insulating layer 18, that is to say on the cold-face side of the insulating layer which is opposite the hot face of the insulating layer. Advantageously, the interrogator is thus well protected from high temperatures.

Preferably, first and second interrogators $14_1$ and $14_2$ are arranged at the input and at the output of each fiber, that is to say at their proximal $12_p$ and distal $12_d$ ends, respectively. For the sake of clarity, only the first and second interrogators $14_1$ and $14_2$ of the first fiber have been shown in FIGS. 1 and 4.

The second interrogator therefore receives the portions of the interrogation signal I injected by the first interrogator which have not been reflected by the various sensors of the optical fiber. For example, if the optical fiber comprises only three sensors and if the interrogation signal and the response signals are those of FIGS. 3*a* and 3*b*, the second interrogator receives the signal shown in FIG. 3*d*.

The two interrogators therefore have a signal that makes it possible to identify the sensors which have responded and therefore to evaluate the temperature or the change in temperature for each sensor.

The second interrogator may also send an interrogation signal.

In particular, if the optical fiber is damaged such that the signal from the first interrogator cannot reach the second interrogator, for example because the fiber has been broken, the first interrogator no longer receives any information from the sensors downstream of the break, i.e. located between the break and the second interrogator. The second interrogator can then interrogate these downstream sensors, by injecting an interrogation signal and by analyzing the signal returned by these downstream sensors. The first interrogator can continue to interrogate the upstream sensors, by injecting an interrogation signal and by analyzing the signal returned by these upstream sensors. The destruction of a sensor therefore has a limited effect on the operation of the optical fiber.

The presence of two interrogators advantageously makes it possible, in the event of a break in the optical fiber, to obtain information relating to the sensors on either side of the region of the break. It therefore improves the robustness of the device.

As is now clearly apparent, the invention provides a solution that makes it possible to evaluate, precisely and in real time, a large number of temperatures in a glass furnace.

Of course, the invention is not limited to the embodiments described and shown, provided only by way of illustration.

In particular, the invention is not limited to an optical fiber as a waveguide. An optical fiber made of glass is preferred because it excludes the risk of contaminating the molten glass.

Other waveguides could however be envisaged. Preferably, the waveguide takes the form of a fiber that preferably has a diameter smaller than 200 micrometers.

All of the features applicable to an optical fiber and described in the present description are applicable to another type of waveguide.

The number of waveguides for a refractory portion or an insulating layer, or an elementary insulating layer, the number of waveguides connected to an interrogator and the shape of the refractory portion, of the insulating layer or of said elementary insulating layers are not limiting. A plurality of waveguides may be connected to the same interrogator.

The hot face of the block is not necessarily entirely in contact with the bath of molten glass. It may not even be in contact with the molten glass, but only be exposed to the gaseous environment above this bath.

The invention is also not limited just to the tank of the glass furnace. The refractory portion could for example be a feeder, a superstructure part (tuckstone, crown block, etc.), a forming part (lip, etc.) or a throat block.

The invention claimed is:

1. A glass furnace comprising:
   a refractory portion defining a face in contact or intended to be in contact with molten glass or with a gaseous environment in contact with molten glass, as a "hot face", and a face at a distance from said hot face, as a "cold face", and
   a temperature measurement device comprising one or a plurality of waveguides and one or a plurality of interrogators:
   each waveguide comprising a measurement portion comprising at least one temperature measurement sensor configured to send a response signal in response to an injection of an interrogation signal into the waveguide, one of said interrogators being connected to an input of the waveguide and configured to inject the interrogation signal into said input, to receive said response signal returned by the at least one temperature measurement sensor in response to the injection of said interrogation signal, to analyze the response signal received to obtain an analysis, and to transmit a message according to said analysis;
   the glass furnace comprising a thermally insulating layer adjacent to the cold face of the refractory portion,
   wherein said thermally insulating layer, or an elementary insulating layer when said thermally insulating layer consists of at least two elementary insulating layers made of different materials, being formed, by sintering at a temperature between 400° C. and 1200° C., around the measurement portion, so that said measurement portion is in contact with said thermally insulating layer, or with said elementary insulating layer when said thermally insulating layer consists of at least two elementary insulating layers made of different materials.

2. A glass furnace as claimed in claim 1, wherein the thermally insulating layer comprises two said elementary insulating layers between which, or within one of which, the measurement portion extends.

3. A glass furnace as claimed in claim 1, wherein said each waveguide is an optical fiber and the temperature measurement sensor is a Bragg grating.

4. A glass furnace as claimed in claim 3, wherein said each waveguide has a diameter of less than 200 micrometers.

5. A glass furnace as claimed in claim 1, wherein the refractory portion is a side wall of a glass melting tank, or a floor, or a feeder, or a superstructure part, or a forming part, or a throat block.

6. A glass furnace as claimed in claim 5, said temperature measurement device comprising a plurality of said waveguides, the glass furnace comprising one or a plurality of sheets, each sheet consisting of a set of measurement portions of said waveguides and extending along a surface parallel to the hot face and/or to the cold face.

7. A glass furnace as claimed in claim 6, comprising a glass melting tank comprising a side wall and a floor, and wherein a sheet of said one or a plurality of sheets encircles the side wall of the glass melting tank and/or wherein a sheet of said one or a plurality of sheets extends into a layer of concrete extending beneath the floor.

8. A glass furnace as claimed in claim 6, wherein a density of said temperature measurement sensors of said plurality of said waveguides in said sheet is higher than three sensors per $m^2$ of the hot face of the refractory portion.

9. A glass furnace as claimed in claim 8, wherein said density of temperature measurement sensors in said sheet is higher than 50 temperature measurement sensors per $m^2$ of the hot face of the refractory portion.

10. A glass furnace as claimed in claim 6, comprising a plurality of said sheets comprising a first sheet and second sheet, said first and second sheets extending parallel to one another, a distance between the first and second sheets being greater than 1 cm, the measurement portions of the first sheet intersecting the measurement portions of the second sheet at intersections, when said first and second sheets are viewed in a direction normal to at least one of said first and second sheets, a sensor being arranged, in the first sheet and/or the second sheet, at more than 50% of the intersections.

11. A glass furnace as claimed in claim 10, wherein, at each intersection between measurement portions, sensors are arranged on each measurement portion.

12. A glass furnace as claimed in claim 1, comprising a plurality of said temperature measurement sensors, which may be in contact or not in contact, superposed along a direction perpendicular to the hot face.

13. A glass furnace as claimed in claim 1, comprising a plurality of said interrogators and a plurality of said waveguides, wherein at least one of said waveguides has a first input at a first end and a second input at a second end, and wherein the first input is connected to a first of said interrogators and the second input is connected to a second of said interrogators.

14. A glass furnace as claimed in claim 1, said glass furnace comprising a floor constituted by slabs, wherein the refractory portion is said floor, and said thermally insulating layer consists of a layer of refractory concrete which extends beneath said slabs.

15. A glass furnace as claimed in claim 1, wherein said thermally insulating layer comprising two said elementary insulating layers, an outermost layer of said two said elementary insulating layers with respect to an interior of the glass furnace having a thermal conductivity of lower than 1.3 W·m$^{-1}$·K$^{-1}$.

16. A glass furnace comprising:
a refractory portion defining a face in contact or intended to be in contact with molten glass or with a gaseous environment in contact with molten glass, as a "hot face" and a face at a distance from said hot face, as a "cold face", and
a temperature measurement device comprising:
a waveguide comprising a measurement portion comprising a plurality of temperature measurement sensors configured to send a response signal in response to an injection of an interrogation signal into the waveguide; and
an interrogator connected to an input of the waveguide and configured to inject the interrogation signal into said input, to receive said response signal returned by the temperature measurement sensors in response to the injection of said interrogation signal, to analyse the response signal received and to transmit a message according to said analysis;
wherein the refractory portion is a floor constituted by slabs, and wherein the glass furnace comprises a thermally insulating layer consisting of a layer of refractory concrete which extends beneath said slabs,
said thermally insulating layer being formed, by sintering at a temperature of between 400° C. and 1200° C., around the measurement portion, so that said measurement portion is in contact with said thermally insulating layer, or, when said thermally insulating layer consists of at least first and second elementary insulating layers made of different materials, is in contact with said first elementary insulating layer,
wherein the waveguide is an optical fiber and the temperature measurement sensors are Bragg gratings.

17. A glass furnace comprising:
a refractory portion defining a face in contact or intended to be in contact with molten glass or with a gaseous environment in contact with molten glass, as a "hot face" and a face at a distance from said hot face, as a "cold face", and
a temperature measurement device comprising:
a waveguide comprising a measurement portion comprising a plurality of temperature measurement sensors configured to send a response signal in response to an injection of an interrogation signal into the waveguide; and
an interrogator connected to an input of the waveguide and configured to inject the interrogation signal into said input, to receive said response signal returned by the temperature measurement sensors in response to the injection of said interrogation signal, to analyse the response signal received and to transmit a message according to said analysis;
the glass furnace comprising a thermally insulating layer adjacent to the cold face of the refractory portion,
wherein said thermally insulating layer, or an elementary insulating layer when said thermally insulating layer consists of at least two elementary insulating layers made of different materials, has been formed, by sintering at a temperature between 400° C. and 1200° C., around the measurement portion, so that said measurement portion is in contact with said thermally insulating layer, or with said elementary insulating layer when said thermally insulating layer consists of at least two elementary insulating layers made of different materials,
an outermost layer of said two said elementary insulating layers with respect to an interior of the glass furnace having a thermal conductivity of lower than 1.3 W·m$^{-1}$·K$^{-1}$,
wherein the waveguide is an optical fiber and the temperature measurement sensors are Bragg gratings.

* * * * *